March 7, 1961     B. E. STENTZ     2,973,823
POWER WHEEL UNIT

Filed Sept. 2, 1959     3 Sheets-Sheet 1

INVENTOR.
Blair E. Stentz
BY Owen & Owen
ATTORNEYS

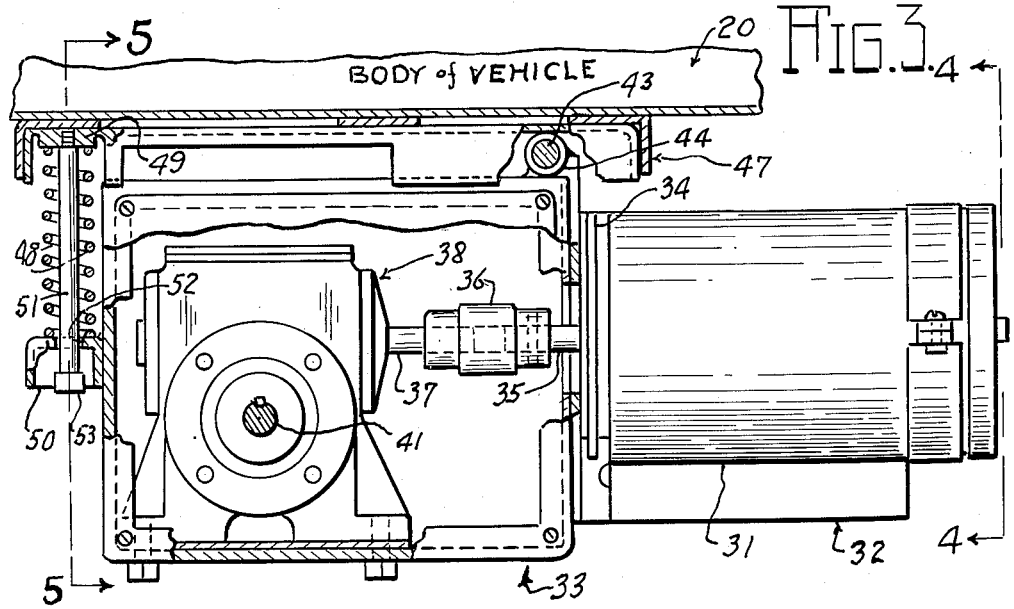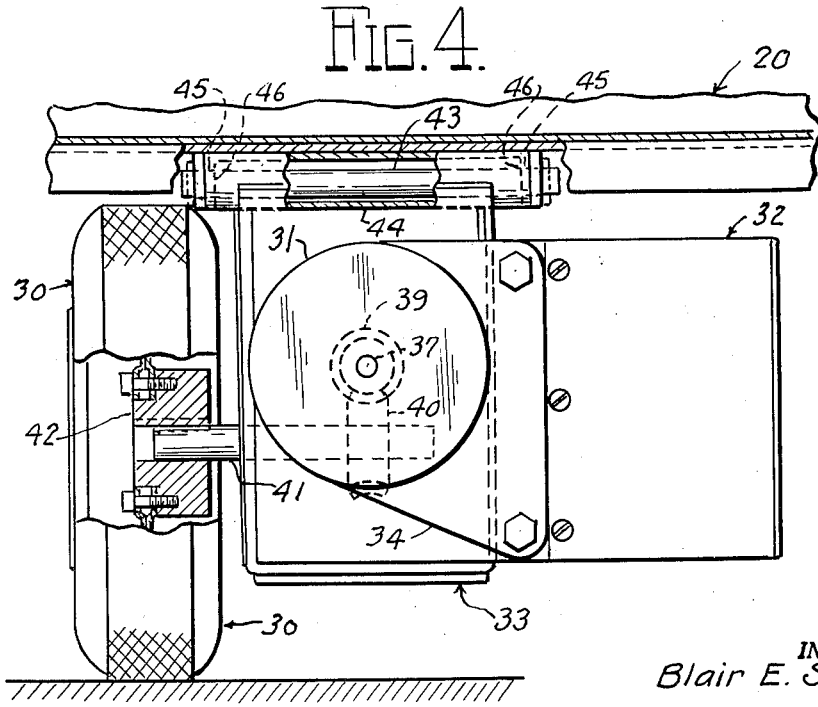

March 7, 1961  B. E. STENTZ  2,973,823
POWER WHEEL UNIT
Filed Sept. 2, 1959  3 Sheets-Sheet 3
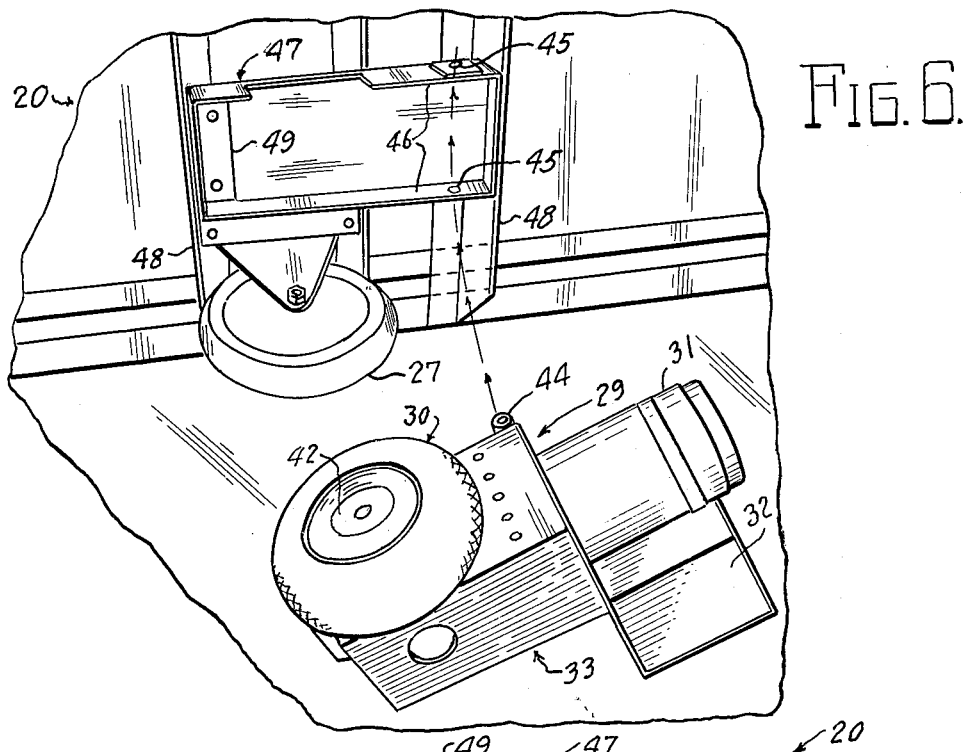
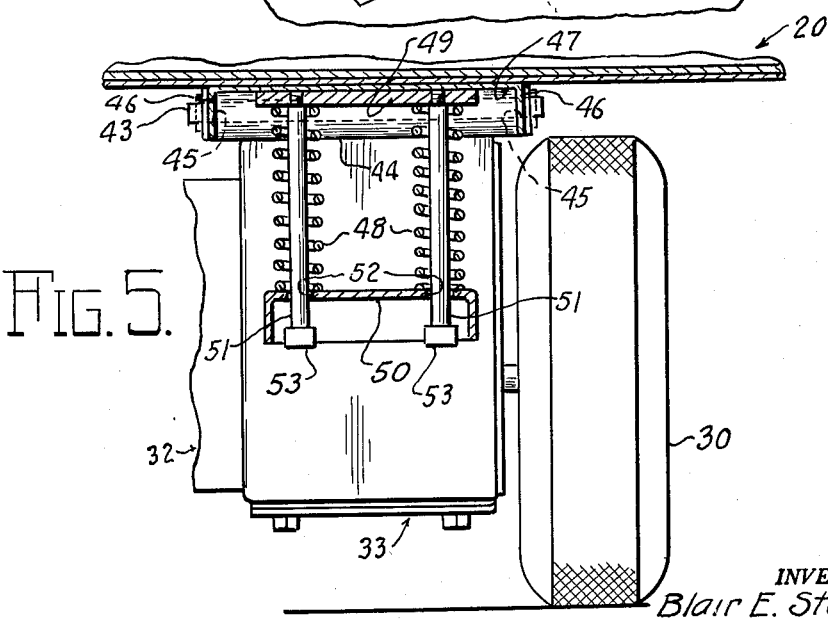
INVENTOR.
Blair E. Stentz
BY
Owen + Owen
ATTORNEYS

United States Patent Office 2,973,823
Patented Mar. 7, 1961

2,973,823

POWER WHEEL UNIT

Blair E. Stentz, Murfreesboro, Tenn., assignor to The Swartzbaugh Manufacturing Company, Murfreesboro, Tenn., a corporation of Ohio Filed Sept. 2, 1959, Ser. No. 837,730

4 Claims. (Cl. 180—11)

This invention relates to power wheel units and more particularly to a power wheel unit adapted to drive a cart and will be illustrated in connection with its use for driving a food service cart of the type employed in hospitals and other institutions for delivery of food to remote locations such as the various floors of a hospital.

Where heavy loads of material must be moved on carts and, in particular, where the carts must be moved by persons other than strong men, the inertia of the load is sometimes so great that starting and stopping the carts becomes very difficult. In newer buildings where ramps are used between floor levels, for example, in modern hospitals, moving a cart such as a food service cart is a task which an average dietician or nurse cannot hope to accomplish.

Motorized wheel units for various types of carts have been suggested in the past but most of them have required that they be built into the units initially or have been complex and difficult to maintain. In an institution such as a hospital no one is available for servicing a unit of this type. In many power driven carts, the motorized wheel is also one of the main support wheels and the power application causes the cart to swing sidewise.

It is, therefore, the principal object of this invention to provide a power wheel unit for a load carrying cart which can readily be removed from the cart so that, in the event of needed service the unit can be removed and replaced by an operable unit and the defective unit sent to a repair station for servicing; similarly, the cart can be used as a non-powered cart when desired by simply removing the unit.

It is another object of the invention to provide a power wheel unit which is compact and self-contained, includes reversing mechanism and is so designed as to be mountable in a manner to insure traction between its drive wheel and the surface over which the cart is being moved.

It is yet another object of the invention to provide a power wheel unit which is not one of the main support wheels for the cart and which is centered on the cart to eliminate sidewise torque and to result in making the cart easier to guide.

Other and more specific objects and advantages of the invention will be better understood from the specification which follows and from the drawings, in which:

Fig. 3 is a fragmentary vertical sectional view taken along the line 3—3 of Fig. 2 and shown on an enlarged scale.

Fig. 4 is a fragmentary view in elevation taken from the position indicated by the line 4—4 of Fig. 3.

Fig. 5 is a fragmentary vertical sectional view with parts shown in elevation, taken from the position indicated by the line 5—5 of Fig. 3.

Fig. 6 is an exploded view showing a fragment of the bottom portion of the cart and a power wheel unit embodying the invention, and illustrating how readily the unit may be removed for servicing and replacement.

Figure 1:
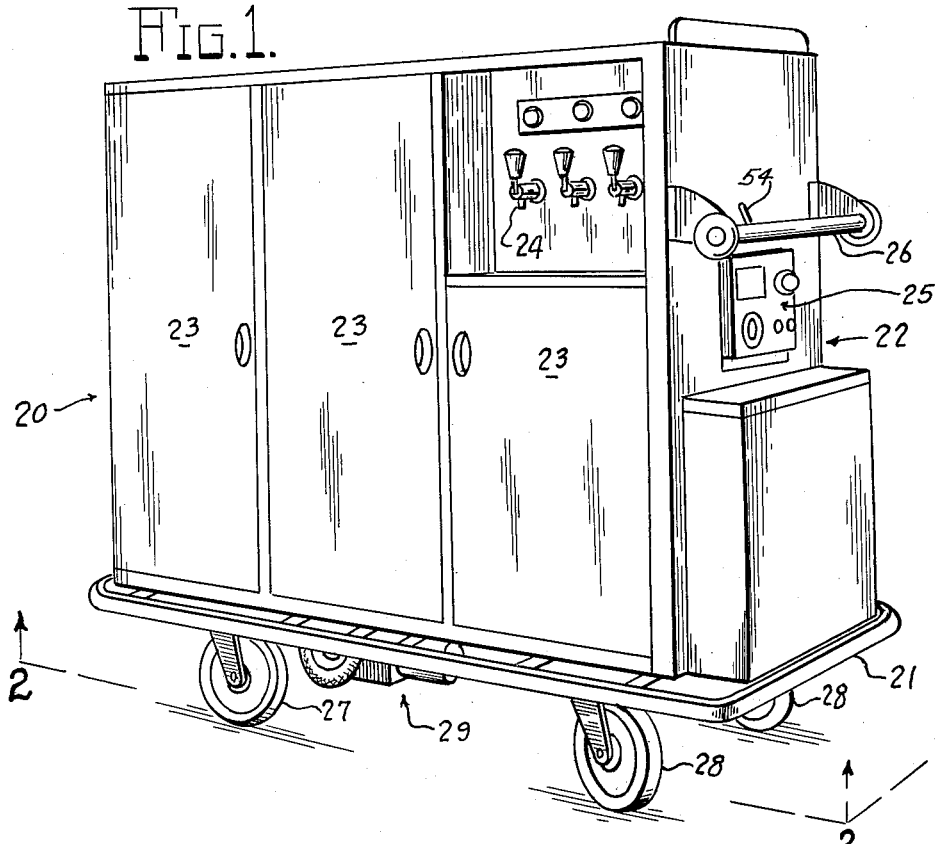
Fig. 1 is a view in perspective of a hospital food service cart equipped with a power wheel unit embodying the invention.
Figure 2:
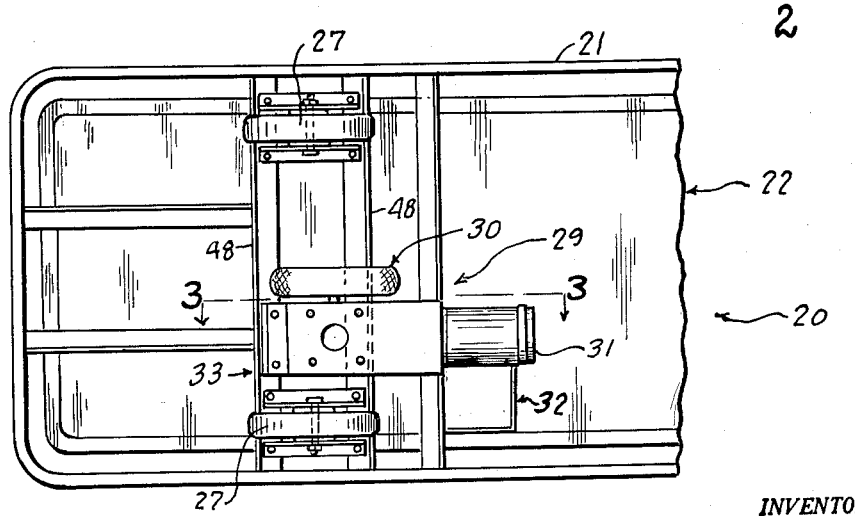
Fig. 2 is a fragmentary bottom plan view taken from the position indicated by the line 2—2 of Fig. 1.

Throughout the following specification a power wheel unit embodying the invention will be described and discussed as it may be employed for powering a food service cart generally indicated in Fig. 1 by the reference number 20. A typical cart of this type has a main base frame 21, a cabinet-like body 22 provided with a plurality of doors 23 for compartments which may be heated or cooled and which usually contain trays and containers of the various foods to be served at the remote location. The cart 20 is illustrated as also comprising a plurality of beverage containers, each equipped with a spigot 24. The cart 20 also has a control panel generally indicated at 25, a handle 26 and a plurality of caster wheels, including both stationary wheels 27 and caster wheels 28.

A power wheel unit 29 embodying the invention includes a drive wheel 30, a motor 31, reversing solenoids mounted in a solenoid box 32 and a gearbox generally indicated at 33. The motor 31 (Figs. 4 and 5) is illustrated as being mounted on the end of the gearbox 33 and held in place by a rigid brace 34. A shaft 35 of the motor 31 is coupled by a universal joint 36 to an input shaft 37 of a right angle reducing transmission 38. The transmission 38 is mounted within the gearbox 33. A worm 39 on the input shaft 37 meshes with a worm gear 40 on an output shaft 41 of the transmission 38. The output shaft 41 also functions as an axle for the drive wheel 30, a hub 42 thereof being keyed on the shaft 41.

The worm and wheel drive serves both to reduce the gear ratio of the drive and as an automatic brake to prevent the cart from gaining excessive speed when it is moving down an inclined surface or when it is parked on an inclined surface.

The power wheel unit as a whole is removably mounted beneath the cart 20 by a mounting pin 43 (Figs. 3 and 4) which extends through a sleeve 44 that is welded to the rear upper corner of the gearbox 33. The pin 43 also extends through two aligned openings 45 in side walls 46 of a rectangular, inverted pan 47 which is secured to the undersurface of cross frame members 48 of the base frame 21 of the cart 20. The pin 43 may be removably positioned in the openings 45, for example by suitable cotter keys or other retaining means. The mass of the motor 31 and solenoid box is substantially less than the mass of the gearbox 33, transmission 38 and drive wheel 30 so that the weight of this latter group of elements tends to swing the power unit 29 as a whole to urge the drive wheel 30 into tight frictional contact with the surface over which the cart 20 is being propelled.

By positioning the pan 47 along the central line of the cart, the power drive wheel 30 applies motive power to the cart along its center line, eliminating any tendency for the wheel 30 to turn the cart and making it easier to guide the cart as it is moved along.

A pair of coil springs 48 extend between a plate 49 which is welded or otherwise rigidly secured near one end of the pan 47 and a bracket 50 (Figs. 3 and 5) mounted on the end of the gearbox 33. Retainer rods 51 are studded into the plate 49 and extend upwardly through holes 52 in the bracket 50 and through the coil springs 48. The retainer rods 51 have enlarged heads 53 at their lower ends, the heads 53 being too large to pass through the holes 52. The springs 48 thus act as shock absorbers when the cart rolls over an uneven surface and the drive wheel 30 hits an obstruction so that it should shift upwardly relative to the wheels 27 and 28. Under such circumstances the upward movement of the drive wheel 30 is resisted by the springs 48 preventing it from bouncing or being thrown out of contact with the surface over which the cart is being driven.

When it is desired to remove a power wheel unit 29 as, for example, to replace it with an operative unit so that it can be sent to a repair station, it is necessary only to remove the two retainer rods 51 and the pin 43, thus freeing the unit 29 for replacement, as is most clearly illustrated in Fig. 6.

A double throw switch 54 is conveniently mounted on the handle 26 for controlling the direction of rotation of the motor 31. Power for the motor 31 may be provided by batteries or from power cables plugged into the control panel 25.

I claim:

1. A power wheel unit for driving a cart including spaced frame members secured to a pan having downwardly extending apertured side walls, said unit comprising a gearbox for mounting a power driven transmission having an output shaft extending outwardly therefrom, a drive wheel mounted on said output shaft adjacent said gearbox, a sleeve carried by said gearbox in parallel relationship with said output shaft and receivable within said pan in aligned relationship with apertures in the opposed side walls, a pin extending through said apertures and said sleeve for pivotally connecting said gearbox to said cart, and means for selectively retaining said pin in said sleeve and apertures whereby said gearbox may be selectively removed from said cart.

2. A power wheel unit according to claim 1 in which the frame members carry a wheel on each side of said pan and the axis of the apertures in the opposed side walls is substantially parallel to the axis of rotation of said wheels, said pan being secured to said frame members along the center line of cart with the apertures located toward one end thereof, and the sleeve being secured to the gearbox at a corresponding end thereof whereby the drive wheel is located along the center line of the cart when the pin is inserted in said sleeve and apertures.

3. A power wheel unit according to claim 1 in which the pan has a plate secured therein, including a bracket secured to said gearbox at a point removed from said sleeve, and resilient means interposed between said bracket and said plate for urging said gearbox away from said cart when said gearbox is pivoted about the pin into said pan.

4. A power wheel unit according to claim 3 in which the transmission is mounted within the gearbox between the sleeve and the bracket whereby the weight of the transmission tends to rotate said gearbox and driving wheel about the pin and move said bracket away from the plate.

References Cited in the file of this patent

UNITED STATES PATENTS

| | | |
|---|---|---|
| 644,950 | Thornton et al. | Mar. 6, 1900 |
| 680,074 | Pullen | Aug. 6, 1901 |
| 1,565,719 | Dunkley | Dec. 15, 1925 |
| 2,706,008 | Voight | Apr. 12, 1955 |